United States Patent
Konno et al.

(10) Patent No.: US 7,008,474 B2
(45) Date of Patent: Mar. 7, 2006

(54) WATER-IN-OIL TYPE EMULSON INK FOR STENCIL PRINTING

(75) Inventors: Yukako Konno, Miyagi-ken (JP); Keisuke Asada, Miyagi-ken (JP)

(73) Assignee: Tohoku Ricoh Co., Ltd., Shibata-Gun (JP)

( * ) Notice: Subject to any disclaimer, the term of this patent is extended or adjusted under 35 U.S.C. 154(b) by 0 days.

(21) Appl. No.: 10/765,884

(22) Filed: Jan. 29, 2004

(65) Prior Publication Data

US 2004/0194658 A1     Oct. 7, 2004

(30) Foreign Application Priority Data

| Jan. 31, 2003 | (JP) | ............................. 2003-025183 |
| May 20, 2003 | (JP) | ............................. 2003-142553 |
| Oct. 31, 2003 | (JP) | ............................. 2003-373671 |

(51) Int. Cl.
*C09D 11/02*     (2006.01)

(52) U.S. Cl. .................................. 106/31.26; 106/31.34

(58) Field of Classification Search ............ 106/31.26, 106/31.34
See application file for complete search history.

(56) References Cited

U.S. PATENT DOCUMENTS

| 5,622,548 | A * | 4/1997 | Zou et al. ................. 106/31.26 |
| 5,718,747 | A * | 2/1998 | Okusawa .................. 106/31.26 |
| 6,342,094 | B1 * | 1/2002 | Kabalnov ................. 106/31.25 |
| 6,663,701 | B1 * | 12/2003 | Ogawa et al. ........... 106/31.25 |
| 2003/0069328 | A1 * | 4/2003 | Fukuda et al. .............. 523/160 |

FOREIGN PATENT DOCUMENTS

| EP | 001227137 A1 * | 7/2002 |
| JP | 10-245516 | 9/1998 |
| JP | 10-259641 | 9/1998 |
| JP | 2001-214102 | 8/2001 |
| JP | 2001-288394 | 10/2001 |
| JP | 2002-220560 | 8/2002 |

* cited by examiner

*Primary Examiner*—Helene Klemanski
(74) *Attorney, Agent, or Firm*—Bacon & Thomas, PLLC

(57) ABSTRACT

A water-in-oil type emulsion ink composed of 10–90% by weight of an oil phase and 90–10% by weight of an aqueous phase. The oil phase contains an esterified vegetable oil (an esterified vegetable oil obtained by recycling and esterifying edible waste oil such as soybean methyl ester, soybean butyl ester, or tall oil butyl ester).

16 Claims, No Drawings

WATER-IN-OIL TYPE EMULSON INK FOR STENCIL PRINTING

CROSS-REFERENCE TO RELATED APPLICATIONS

This application claims under 35 USC 119, priority of Japanese Applications No. 2003-25183 filed Jan. 31, 2003, 2003-142553 filed May 20, 2003 and No. 2003-373671 filed Oct. 31, 2003, the disclosure of which is hereby incorporated by reference herein.

BACKGROUND OF THE INVENTION

This invention relates to an emulsion ink of a water-in-oil (w/o) type useful for stencil printing and, more particularly, to a water-in-oil type emulsion ink for stencil printing which contains an esterified vegetable oil and which is environmentally friendly, safe and stable.

In stencil printing, an ink is applied onto a perforated stencil master backed by a printing paper and is passed through the perforations to form an image on the printing paper. A well-known ink for use in stencil printing is a water-in-oil type (w/o) emulsion ink containing a volatile solvent, a non-volatile solvent, a resin, a coloring agent, a surfactant, water, an antifreezing agent, an electrolyte and an antiseptic agent.

In recent years, an ink containing a vegetable oil is used as an ink for stencil printing which is safe and stable in any environment and can make good prints having a high image density and free from offset.

For example, JP-A-H10-245516 discloses a w/o type emulsion ink for stencil printing containing an vegetable oil having an iodine value of 100 or lower and a melting point of 0° C. or lower. In this ink, a non-volatile oil having an iodine value of 100 or lower is used to prevent solidification of the ink. However, water in the ink vaporizes and the viscosity of the ink decreases with time. As a result, an excess amount of the ink is loaded onto a paper to cause offset.

JP-A-H10-259341 discloses a w/o type emulsion ink for stencil printing containing an animal fat or vegetable oil ester comprising a fatty acid, and an oil or fat having a melting point of 20–55° C. Thus, when the ink is used after having been maintained in a low-temperature environment, good prints cannot be made.

JP-A-2002-220560 discloses a w/o type emulsion ink for stencil printing containing a vegetable oil having an iodine value of 110–150. This ink contains a vegetable oil having an iodine value of 110–150 and an oxidation inhibitor so that the ink does not cause clogging of the screen or offset even when left unused for a long time. The oxidation inhibitor is dibutylhydroxytoluene, propyl gallate, butylhydroxyanisole or the like. It is well known that these oxidation inhibitors are stable but not safe. Thus, an oxidation inhibitor which is safer than the conventional oxidation inhibitors is demanded. However, under the current circumstances, it is difficult to obtain an oxidation inhibitor excellent in both stability and safety. In addition, when an oxidation inhibitor is used, the vegetable oil undergoes oxidation when the effect of the oxidation inhibitor is lost.

Oils used in making foods and beverages (waste edible oils) are recycled and reused in the production of animal feed, soap and other products or as fuel. However, waste edible oils are increasing every year and cannot be used up.

SUMMARY OF THE INVENTION

The present invention has been made to solve the above problems and it is, therefore, an object of the present invention to provide a w/o emulsion ink for stencil printing which can make good prints and which is excellent in both stability and safety.

In accomplishing the foregoing objects, there is provided in accordance with the present invention a w/o type emulsion ink for stencil printing comprising 10–90% by weight of an oil phase and 90–10% by weight of an aqueous phase, the oil phase containing an esterified vegetable oil.

The emulsion ink according to the present invention has excellent stability notwithstanding the fact that the ink contains a vegetable oil for environmental friendliness. Since an esterified vegetable oil is less likely to be oxidized than a non-esterified vegetable oil, there can be obtained a w/o type emulsion ink which is stable even when left stand under service conditions on a printing machine and does not cause clogging. In addition, since there is no need to use an oxidation inhibitor, there can be obtained a safer w/o type emulsion ink.

Other objects, features and advantages of the present invention will become apparent from the detailed description of the preferred embodiments to follow.

DETAILED DESCRIPTION OF THE PREFERRED EMBODIMENTS OF THE INVENTION

The w/o type emulsion ink for stencil printing according to the present invention comprises 10–90% by weight of an oil phase and 90–10% by weight of an aqueous phase. The oil phase comprises an oil component (esterified vegetable oil) and, optionally, a pigment dispersing agent, a pigment, an extender, a resin, an emulsifier and other additives. The aqueous phase comprises water and, optionally, an electrolyte, a mildew-proof agent, water-evaporation preventive, a water-soluble polymer, an oil-in-water (o/w) type resin emulsion and other additives. As the above ingredients, known substances which do not adversely affect the formation of an emulsion may be used without restriction.

Specific examples of the esterified vegetable oil include but are not limited to esterified products of vegetable oils such as soybean oil, tall oil, rapeseed oil, corn oil, rice oil, cotton oil, sesame oil, sunflower oil, safflower oil, olive oil, palm oil, coconut oil, linseed oil, palm kernel oil, and wood oil. Esterified products of vegetable oils recovered as waste edible oil after use and recycled can be also used. Examples of the edible waste oils include but not limited to vegetable oils recovered after being used to make tempuras or the like in restaurants and takeout food shops, or for school lunch. Any used vegetable oil can be used as long as it is recyclable.

The vegetable oil is preferably esterified to a lower alkyl-ester (C1–C8 alkyl) such as a methyl ester, an ethyl ester, a butyl ester or a combination thereof.

The use of an esterified product of recycled waste edible oil is preferred, since a w/o type emulsion ink for stencil printing which is more environmentally friendly is obtainable. Conventionally, oils used in making foods and beverages (waste edible oils) are recycled and used in the production of animal feed, soap and other products or as fuel. However, waste edible oils are increasing every year and cannot be used up. According to the present invention, waste edible oils can be recycled and used in the production of ink.

A methyl-esterified soybean oil is also preferable because it is less likely to be oxidized than refined soybean oil. Therefore, in this case, there can be obtained a w/o type emulsion ink for stencil printing which has high stability even when left stand under service conditions on a printing machine (which will be hereinafter referred to as service stability). An ink containing at least 6% by weight of soybean oil based on the weight of the ink is desirable since it meets the requirement for a soybean oil-based ink by the American Soybean Association.

A butyl-esterified soybean oil is less likely to be oxidized than refined soybean oil and is also preferable. By using the butyl-esterified soybean oil, there can be obtained a w/o type emulsion ink for stencil printing which has high service stability.

The use of a butyl-esterified tall oil, which is less likely to be oxidized than tall oil, is also preferred, because there can be obtained a w/o type emulsion ink for stencil printing which has high service stability. Since tall oil butyl ester has low volatility, components derived from vegetable oils can be increased in the ink.

The esterified vegetable oil for use in the present invention preferably has an ester value of 80–260, a melting point of lower than 20° C. and an iodine value of about 130 or lower. When the melting point is lower than 20° C., the ink can make good prints even when used after being stored in a low temperature environment. When the iodine value exceeds 130, the ink tends to dry quickly.

The content of the esterified vegetable oil in the ink is preferably 5–20% by weight. As mentioned before, when the ink contains at least 6% by weight, based on the weight of the ink, of a vegetable oil derived from soybean oil, the ink meets the requirement for a soybean oil-based ink by the American Soybean Association.

If desired, the esterified vegetable oil may be used in conjunction with one or more other known oils such as a mineral oil, a petroleum solvent, a liquid paraffin and a spindle oil.

Illustrative of suitable paraffin oils are Gargoyle Arctic Oil series (manufactured by Mobil Sekiyu Kabushiki Kaisha), Nisseki Super Oil series (manufactured by Nippon Oil Corporation), and Diana Process Oil series and Diana Fresia series (manufactured by Idemitsu Kosan Co., Ltd.).

As the mineral oil, a naphthene oil having a naphthenic carbon content ($C_N$) of at least 30%, an aromatic carbon content ($C_A$) of 20% or less and a paraffinic carbon content ($C_P$) of 55% or less as measured by ring analysis is suitably used. Illustrative of suitable naphthene oils are Gargoyle Arctic Oil 155 and 300ID, Gargoyle Arctic Oil Light and Gargoyle Arctic Oil C-Heavy (manufactured by Mobil Sekiyu Kabushiki Kaisha), Diana Process Oil series and Diana Fresia series (manufactured by Idemitsu Kosan Co., Ltd.), and Sunthene Oil series (manufactured by Japan Sun Oil Co., Ltd.).

Illustrative of petroleum solvents with high safety are ISOPAR series and EXXSOL series (manufactured by Exxon Chemicals Co., Ltd.), and AF Solvent series (manufactured by Nippon Oil Co., Ltd.).

Further, for reasons of stability, the oil component preferably has less than 3% by weight of a content of polycyclic aromatic compounds including aromatic compounds having at least three condensed aromatic rings.

In addition, an aroma oil with high safety may be used when necessary. The aroma oil may be as disclosed in JP-A-H11-80640 and have a mutagenicity index (MI) of less than 1.0, an aromatic carbon content (% $C_A$) of 20–55%, an aniline point of not higher than 100° C., a total polycyclic aromatics content of not greater than 50 ppm by weight based on a total oil content of the oil and a content of individual polycyclic aromatic of not greater than 10 ppm by weight. The polycyclic aromatics may include benzo[a] anthracene, benzo[b]fluoranthene, benzo[j]fluoranthene, benzo[k]fluoranthene, benzo[a]pyrene and dibenzo[a,j]acridine.

These oils may be used singly or in combination of two or more thereof.

The coloring agent for use in the present invention may be any known pigment or dispersing dye. An insoluble pigment or dye is preferably used. Examples of the coloring agents include carbon black such as acetylene black, channel black and furnace black; metal powder such as aluminum powder and bronze powder; inorganic pigments such as red oxide of iron, chrome yellow, ultramarine blue, chromium oxide and titanium oxide; azo pigments such as insoluble azo pigments, azo lake pigments and condensed azo pigments; phthalocyanin pigments such as metal-free phthalocyanin pigments and a copper phthalocyanin pigment; condensed polycyclic pigments such as anthraquinone pigments, quinacridone pigments, isoindolinone pigments, isoindolin pigments, dioxazine pigments, threne pigments, perylene pigments, perinone pigments, thioindigo pigments, quinophthalone pigments and metal complex pigments; organic pigments such as lake of acid or basic dyes; diazo dyes; anthraquinone dyes; carbonyl dyes; quinonimine dyes; methine dyes; quinoline dyes; nitro dyes; and fluorescent pigments. These pigments and dyes may be used singly or in combination of two or more thereof.

The fluorescent pigment suitably used for the purpose of the present invention is in the form of a synthetic resin matrix composited-type in which a fluorescent dye is supported by the resin matrix. The composite is prepared by dissolving the dye in a polymerization reaction solution or product, and then finely pulverizing the dye-bearing polymer. The polymer may be, for example, a melamine resin, a urea resin, a sulfonamide resin, an alkyd resin or a polyvinyl chloride resin.

When carbon black is used as the pigment, acidic carbon black having a pH of less than 5 is preferably used for incorporation into the oil phase. Examples of suitable carbon black pigments include Carbon Black MA-100, MA-7, MA-77, MA-11, #40 and #44 (products of Mitsubishi Chemical Corporation) and Raven 1100, Raven 1080, Raven 1255, Raven 760, and Raven 410 (products of Columbian Carbon Japan Ltd.).

The coloring agent is incorporated into at least one of the oil phase and the aqueous phase. Thus, the above exemplified coloring agents may be also used for the incorporation into the aqueous phase. The pigment to be dispersed in the oil phase and/or aqueous phase preferably has an average particle size of 0.1–10 μm, more preferably 0.1–1 μm. The amount of the pigment is suitably determined according to the intended color density of the prints and is generally in an amount of 2–15% by weight based on the ink. Two or more coloring agents of similar types may be incorporated into the same phase. Two coloring agents of different colors may be incorporated into the same phase or different phases. When pigments of different types (color tone, specific gravity, etc.) are used, the pigments are preferably incorporated into different phases to avoid problems which may occur when the pigments contact with each other.

When a coloring agent is incorporated into the oil phase in addition to the aqueous phase, the uniformity of printed images can be improved. When an ink penetrates into paper, the oil component surrounding the aqueous phase penetrates into the paper first and then the aqueous phase penetrates into the paper. When the fibers of the paper are wet with oil, the wettability of the fibers of the paper with the water phase decreases and the aqueous phase component cannot spread in the paper. When a coloring agent is incorporated into the oil phase as well as into the aqueous phase, the coloring agent can adheres to the fibers of the paper uniformly and image uniformity can be improved. When a coloring agent is incorporated only into the oil phase, the aqueous phase component attached to the fibers of the paper rejects the oil phase component and prevents the coloring agent from adhering properly. Thus, sufficient image uniformity cannot be obtained.

An emulsifier is used for the formation of a water-in-oil type emulsion. The emulsifier is preferably a nonionic surfactant such as a fatty acid ester of sorbitan, a fatty acid ester of polyoxyethylene-sorbitan, (poly)glyceride of a fatty acid, a polyoxyethylenesorbitol fatty acid ester, a polyoxyethyleneglycerol fatty acid ester, a polyethylene glycol fatty acid ester, polyoxyethylene alkyl ether, polyoxyethylene alkylphenyl ether, polyoxyethylenealkylamine, a fatty acid amide, polyoxyethylene polyoxypropylene alkyl ether, polyoxyethylene castor oil, hardened castor oil, and higher alcohols. These surfactants may be used singly or in combination of two or more thereof. Two or more emulsifiers with different HLB may be used in combination to prepare an emulsion with high stability. The emulsifier is used in an amount of 1–8% by weight, preferably 2–5.5% by weight, based on the weight of the ink.

A resin is incorporated into the oil phase to keep the pigment in suspension. Illustrative of suitable resins are rosin; rosin derivatives such as polymerized rosin, hydrogenated rosin, esterified rosin, rosin polyester resins, hydrogenated and esterified rosin; rosin-modified resins such as rosin-modified alkyd resins, rosin-modified maleic acid resins and rosin-modified phenol resins; maleic acid resins; phenol resins; petroleum resins; rubber-derived resins such as cyclized rubbers; terpene resins; alkyd resins; and polymerized castor oil. These resins may be used singly or as a mixture of two or more thereof. Above all, the use of alkyd resins is preferred in particular. The resin incorporated into the oil phase improves the adhesion of the ink to the paper.

An alkyd resin is constituted from a fat or oil, a polybasic acid, and a polyhydric alcohol. Examples of fats and oils include non-drying oil and semi-drying oil having an iodine value of 80 or less and fatty acids of these oils, such as coconut oil, palm oil, olive oil, castor oil, rice bran oil and cotton oil. Drying oil such as soybean oil, linseed oil and tung oil may also be used as long as the resulting alkyd resin has an iodine value of 80 or less.

Examples of the polybasic acids include saturated polybasic acids such as phthalic anhydride, isophthalic acid, terephthalic acid, succinic acid, adipic acid, sebacic acid, tetrahydrophthalic acid; and unsaturated polybasic acids such as maleic acid, maleic anhydride, fumaric acid, itaconic acid and citraconic anhydride.

Examples of polyhydric alcohols include ethylene glycol, diethylene glycol, triethylene glycol, polethylene glycol, propylene glycol, trimethylene glycol, tetramethylene glycol, glycerin, trimethylolpropane, neopentyl glycol, diglycerin, triglycerin, penthaerythritol, dipentaerythritol, mannitol and sorbitol.

The alkyd resin preferably has an oil length of 60–90 and an iodine value of 80 or less for reasons of dispersion stability and prevention of clogging of the cylinder screen caused by film formation. The term "oil length" of the alkyd resin used herein is intended to refer to a percentage of the weight of the fatty acids contained in the fat and oil based on the weight of the alkyd resin when calculated in terms of triglycerides. The alkyd resin preferably has a molecular weight of less than 30,000, more preferably 10,000 or less.

The resin to be incorporated into the oil phase is preferably used in an amount of 2–50% by weight, more preferably 5–20% by weight, based on the weight of the oil phase, for reasons of cost and printing property of the ink.

The resin preferably has a weight average molecular weight of 8,000–160,000, more preferably 30,000–80,000, for reasons of printing property of the ink. Too large an amount of the resin and too high a molecular weight of the resin would cause a problem of ink leakage, while a too small an amount and a too low a molecular weight of the resin would cause a problem in fixation of the ink.

Examples of the resins are KG-836, KG-846, KG-1801, KG-1832, KG-1829, KG-1804, KG-1828, KG-1808-1, KG-1834, KG-1831, KG-1833, TAMANOL 353, TAMANOL 403, TAMANOL 371, TAMANOL 394 (products of Arakawa Chemical Industries Ltd.), HARIPHENOL 561, 564, 582, 173, T-3120, T-3040, P-637, and 295 (products of Harima Chemicals Inc.).

As the dispersing agent for the coloring agent for use in the oil phase, a dispersing agent which does not adversely affect the formation of the emulsion is used. The nonionic surfactants and water-soluble polymers for the emulsifier may be used. Other examples are alkylamines having a high molecular weight, aluminum chelate compounds, styrene-maleic anhydride copolymers, high molecular weight polycarboxylic acid esters, aliphatic polycarboxylic acids, amine salts of polyesters, ester-type anionic surfactants, long chain amine salts of high molecular weight polycarboxylic acids, salts of long chain polyaminoamides with polyesters, polyamides, phosphoric acid ester surfactants, salts of alkylsulfocarboxylic acids, salts of α-olefinsulfonic acids, salts of dioctylsulfosuccinic acid, polyethylene imines, salts of alkylolamines and resins capable of dispersing the insoluble coloring agents such as alkyd resins. An anionic, cationic or amphoteric surfactant may also be used as the dispersing agent as long as it does not adversely affect the storage stability of the ink.

The above-described dispersing agents may be used singly or as a mixture of two or more. The dispersing agent which is a resin or a polymer is used in an amount of 40% by weight or less, preferably 2–35% by weight, based on the weight of the pigment. The dispersing agent which is not a resin or a polymer is used in an amount of 40% by weight or less, preferably 2–35% by weight, based on the weight of the pigment.

Alkyd resins improve the dispersion stability of the insoluble coloring agent when a resin with a high molecular weight is added. When an alkyd resin is used singly or in combination of other dispersing agents, the alkyd resin is preferably used in an amount of at least 0.05 parts by weight per part by weight of the pigment.

A gelation agent serves to form a gel of the resin contained in the oil phase and to improve the storage stability, fixation property and fluidity of the ink. Thus, it is preferred that the gelation agent be capable of forming a coordinate bond with the resin contained in the oil phase.

Illustrative of suitable gelation agents are organic acid salts, organic chelates and metal soap oligomers containing Li, Na, K, Al, Ca, Co, Fe, Mn, Mg, Pb, Zn or Zr. Specific examples of the gelation agent include metal salts of octylic acid such as aluminum octylate, metal salts of naphthenic acid such as manganese naphthenate, metal salts of stearic acid such as zinc stearate, and organic chelates such as aluminum diisopropoxide monoethylacetoacetate. These gelation agents may be used singly or as a mixture of two or more thereof and is generally used in an amount of not more than 15% by weight, preferably 5–10% by weight, based on the weight of the resin component in the oil phase.

Although the emulsion ink for stencil printing according to the present invention is stable without an oxidation inhibitor, an oxidation inhibitor may be used to improve the stability, if desired. The oxidation inhibitor to be incorporated into the oil phase may be, for example, dibutylhydroxytoluene, propyl gallate and butylhydroxyanisole and is generally used in an amount of 2% by weight or less, preferably 0.1–1% by weight, based on the weight of the oil component in the ink. If desired, two or more oxidation inhibitors may be used in combination.

An extender may be added in the ink to control the viscosity of the ink and to prevent ink blurs.

The extender may be incorporated into the oil phase and/or aqueous phase. The extender may be fine particles of inorganic materials such as clay, silica, talc, calcium carbonate, barium sulfate, titanium oxide, alumina white, diatomaceous earth, kaolin, mica and aluminum hydroxide, or fine particles of organic materials such as polyacrylic ester, polyurethane, polyester, polyethylene, polypropylene, polyvinyl chloride, polyvinylidene chloride, polystyrene, polysiloxane, phenol resins, epoxy resins and copolymers thereof.

The extender is used in an amount of 0.1–50% by weight, preferably 1–5% by weight, based on the ink.

The electrolyte in the aqueous phase serves as an emulsion stabilizer. Thus, an electrolyte is used when the aqueous phase does not contain any material which is adversely affected by the electrolyte.

A salt providing anions such as citrate ions, tartrate ions, sulfate ions and acetate ions, or a salt providing cations such as alkali metal ion and alkaline earth metal ions may be suitably used. Illustrative of suitable electrolytes are magnesium sulfate, sodium sulfate, sodium citrate, sodium hydrogenphosphate, sodium borate, and sodium acetate. These electrolytes may be used singly or in combination of two or more thereof. The electrolyte is generally used in an amount of 0.1–2% by weight, preferably 0.5–1.5% by weight, based on the weight of the aqueous phase.

A water-soluble polymer and/or an oil-in-water (o/w) type emulsion may be incorporated into the aqueous phase of the emulsion ink as a viscosity controlling agent, a wetting agent for the prevention of drying of the aqueous phase, and to improve the dispersion and adhesion of the insoluble coloring agent and the extender.

As the water-soluble polymer, both natural and synthetic polymers may be used. Examples of water-soluble polymers include natural polymers such as starch, mannan, sodium alginate, galactan, tragacanth rubber, gum Arabic, pullulan, dextran, xanthan rubber, glue, gelatin, collagen, and casein; semi-synthetic polymers such as carboxymethyl cellulose, hydroxymethyl cellulose, methyl cellulose, hydroxyethyl cellulose, hydroxypropyl cellulose, hydroxypropyl methylcellulose, hydroxymethyl starch, carboxymethyl starch, dialdehyde-type starch; neutralization products such as acrylic resins and sodium salt of polyacrylic acid; polyvinylimide; polyvinyl alcohol; polyvinyl pyrrolidone; poly-ethylenimine; polyacrylamide; poly-N-alkylsubstituted acrylamide such as poly-N-acryloylpyrrolidine and poly-N-isopropylacrylamide; polyethylene oxide; polyvinyl methyl ether; styrene-maleic anhydride copolymer; styrene-acrylic acid copolymer and a polymer obtained by incorporating alkyl groups into the above copolymer for imparting hydrophobicity. Acrylamide polymers and acrylic polymers may be of a partly hydrophobic copolymer-type in which alkyl groups are incorporated into part of the monomer units. A block-copolymer of polyethylene and polypropylene or polybutylene may also be used.

The above water-soluble polymers may be used singly or in combination with two or more thereof. The amount of the water-soluble polymer is generally 25% by weight or less, preferably 0.5–15% by weight, based on the weight of the water contained in the ink.

The o/w type emulsion contains a synthetic or natural polymer. The synthetic polymer may be, for example, polyvinyl acetate, acrylic ester, methacrylic ester, vinyl chloride, ethylene-vinyl acetate copolymer, vinyl acetate-acrylic ester copolymer, styrene-acrylic ester copolymer, vinylidene chloride-acrylic ester copolymer, vinyl chloride-vinyl acetate copolymer, or urethane. The natural polymer as used in the oil phase may be used for the formation of the o/w type emulsion.

Two or more different kinds of o/w type emulsions may be used as long as they do not affect the stability of the w/o type emulsion ink. The emulsion may be prepared in any known emulsifying method using a suitable dispersing agent, a protective colloid or a surfactant. Soap-free emulsion polymerization may also produce the o/w type emulsion. It is preferred that the o/w emulsion have a minimum film forming temperature of not higher than 40° C.

The mildew-proof agent is used for the prevention of growth of molds or germs in the ink during storage. It is recommendable to use a mildew-proof agent when the emulsion ink of the present invention is intended to be stored for a long period of time. Illustrative of suitable mildew-proof/antiseptic agent are aromatic hydroxyl compounds or their chlorinated derivatives such as salicylic acid, phenol compounds, methyl p-oxybenzoate and ethyl p-oxybenzoate; sorbic acid and dehydroacetic acid. These compounds may be used singly or in combination of two or more thereof. The mildew-proof agent is generally used in an amount of not greater than 3% by weight, preferably 0.1–1.2% by weight, based on the weight of the water in the ink.

The antifreezing agent which may also serve as a wetting agent may be, for example, glycols such as ethylene glycol, diethylene glycol and propylene glycol; lower saturated monohydric alcohols such as methanol, ethanol, isopropanol, butanol and isobutanol; and polyhydric alcohols such as glycerin and sorbitol.

These compounds may be used singly or in combination of two or more thereof. The amount of the antifreezing agent is generally not greater than 15% by weight, preferably 4–12% by weight, based on the weight of the water in the ink.

If desired, a pH controlling agent, such as triethanolamine, sodium acetate, triamylamine, sodium hydroxide, or ammonia, is used to maintain the pH of the aqueous phase at a suitable range of 6–8. The pH-controlling agent can serve to increase the viscosity of the ink by incorporation of the water-soluble polymer. Too high or low pH adversely affects the effect of the water-soluble polymer as a viscosity controlling agent.

If desired, a wax may be incorporated into the oil phase for the purpose of improving separation between a printing drum and printing paper or of preventing the sticking of printing paper. The aqueous phase may contain triethanolamine or sodium hydroxide, which can serve to increase the viscosity of the ink by incorporation of the water-soluble polymer. If desired, other conventional additives such as a preservative for the prevention of rust of a printer and an anti-foaming agent may be incorporated into the aqueous phase in a suitable amount.

The w/o type emulsion ink according to the present invention may be prepared by any known method. For example, an oil phase in the form of an aqueous dispersion containing, for example, a pigment, an emulsifier, a resin and other additives is prepared at room temperature. An aqueous phase containing a mildew-proof/antiseptic agent, a water-soluble polymer, and other additives is then gradually mixed with the oil phase to form an emulsion.

The viscosity of the ink may be adjusted also by stirring conditions for the formation of the emulsion. It is desirable to adjust the viscosity of the ink to 3–40 Pa·s, more preferably 6–30 Pa·s, at a shear rate of 20 s$^{-1}$, though any viscosity may be adopted as long as the ink can meet with a given printing system.

The following examples will further illustrate the present invention.

EXAMPLES 1–9, COMPARATIVE EXAMPLE 1

A coloring agent, oil(s) and a dispersing agent as shown below were mixed and kneaded with three rolls. The resulting dispersion was mixed with a vanish containing an emulsifier and oil(s) as shown below to obtain an oil phase. An aqueous phase containing water, an anti-freezing agent, an electrolyte and a mildew-proof agent as shown below was gradually added to the oil phase using an emulsifying device to obtain a w/o type emulsion ink having the composition shown below.

In Examples 1–9 and Comparative Example 1, the carbon black is MA-77 (product of Mitsubishi Chemical Corporation), and the pigment dispersant (aluminum chelate) is Plenact AL-M (product of Ajinomoto Inc.). The mineral oils are paraffin oils manufactured by Mobil Sekiyu Kabushiki Kaisha (Gargoyle Arctic Oil Light and Gargoyle Arctic Oil). As the phthalocyanine blue, vegetable oils (soybean oil, ester value: 190, iodine value: 132, soybean oil methyl ester, ester value: 195, iodine value: 120, evaporation rate: 4.80%, soybean oil butyl ester, ester value: 170, iodine value: 100, evaporation rate: 0.93%, tall oil butyl ester, iodine value: 110, acid value: 2, evaporation rate: 0.067%, castor oil, iodine value: 86, freezing point: −14° C.), sorbitan sesquioleate, ion-exchanged water, ethylene glycol, magnesium sulfate, and methyl p-oxybenzoate, commercially available products were used. The evaporation rates were measured according to ASTM D6419.

TABLE 1

| Example Comparative example | | 1 | 2 | 1 | 3 | 4 |
|---|---|---|---|---|---|---|
| Pigment | Carbon black | 4.5 | 4.5 | 4.5 | 4.5 | 4.5 |
| | Phthalocyanin Blue | 0.5 | 0.5 | 0.5 | 0.5 | 0.5 |
| Dispersing agent for Pigment | Aluminum chelate | 0.5 | 0.5 | 0.5 | 0.5 | 0.5 |
| Mineral oil | Gargoyle Arctic oil light | | | 10.7 | | |
| | Gargoyle Arctic oil 1046 | 10.7 | 10.7 | | 10.7 | |
| Vegetable oil | Soybean oil methyl ester | 10.0 | | | | |
| | Soybean oil butyl ester | | 10.0 | | | |

TABLE 1-continued

| Example Comparative example | | 1 | 2 | 1 | 3 | 4 |
|---|---|---|---|---|---|---|
| | Soybean oil isobutyl ester | | | | 8.0 | 18.7 |
| | Tall oil butyl ester | | | | | |
| | Castor oil Soybean oil | | | 10.0 | 2.0 | 2.0 |
| Oxidation inhibitor | Butyl-hydroxyanisole | | | | | |
| Emulsifier | Sorbitan sesquioleate | 4.0 | 4.0 | 4.0 | 4.0 | 4.0 |
| Water | Ion-exchanged water | 58.7 | 58.7 | 58.7 | 58.7 | 58.7 |
| Anti-freezing agent | Ethylene glycol | 10.0 | 10.0 | 10.0 | 10.0 | 10.0 |
| Electrolyte | Magnesium sulfate | 1.0 | 1.0 | 1.0 | 1.0 | 1.0 |
| Mildew-proof agent | Methyl p-oxybenzoate | 0.1 | 0.1 | 0.1 | 0.1 | 0.1 |

TABLE 2

| Example | | 5 | 6 | 7 | 8 | 9 |
|---|---|---|---|---|---|---|
| Pigment | Carbon black | 4.5 | 4.5 | 4.5 | 4.5 | 4.5 |
| | Phthalocyanin Blue | 0.5 | 0.5 | 0.5 | 0.5 | 0.5 |
| Dispersing agent for Pigment | Aluminum chelate | 0.5 | 0.5 | 0.5 | 0.5 | 0.5 |
| Mineral oil | Gargoyle Arctic oil light | 10.7 | | | | |
| | Gargoyle Arctic oil 1046 | | | 10.7 | | 9.7 |
| Vegetable oil | Soybean oil methyl ester | 6.0 | 16.0 | | 7.0 | 10.0 |
| | Soybean oil isobutyl ester | | | | 7.0 | |
| | Tall oil butyl ester | | | 10.0 | 6.7 | |
| | Castor oil Soybean oil | 4.0 | 4.7 | | | |
| Oxidation inhibitor | Butyl-hydroxyanisole | | | | | 1.0 |
| Emulsifier | Sorbitan sesquioleate | 4.0 | 4.0 | 4.0 | 4.0 | 4.0 |
| Water | Ion-exchanged water | 58.7 | 58.7 | 58.7 | 58.7 | 58.7 |
| Anti-freezing agent | Ethylene glycol | 10.0 | 10.0 | 10.0 | 10.0 | 10.0 |
| Electrolyte | Magnesium sulfate | 1.0 | 1.0 | 1.0 | 1.0 | 1.0 |
| Mildew-proof agent | Methyl p-oxybenzoate | 0.1 | 0.1 | 0.1 | 0.1 | 0.1 |

Each of the emulsion inks was tested for stability when left stand under service conditions on a printing machine. The results are summarized in Table 3. As is clear from the results, the emulsion ink according to the present invention is not solidified and does not cause clogging of the screen even after having been left on a stencil printing machine for a long time. Since the oils used in examples 4, 6 and 8 are all vegetable oils, the emulsion inks of Examples 4, 6 and 8 are environmentally friendly. Especially, since the oils used in Example 8 are all recycled vegetable oils, the emulsion ink of Example 8 is more environmentally friendly.

Service Stability:

To evaluate the service stability of the emulsion ink, the following two tests were conducted.
(1) The drum of a printing machine has been left in an oven at 60° C. for one week. Then, printing is again conducted and the prints are observed with naked eyes to evaluate the time it took to get a good print.
  A: a complete image can be printed in a short period of time
  B: it takes some time until a complete image can be printed
  C: it takes long time until a complete image can be printed (or a complete image cannot be printed)
(2) Ink sample put in a petri dish is left in open air at 60° C. for one week. The difference in viscosity before and after being left is evaluated on the basis of the following ratings:
  A: not increased
  B: slightly increased
  C: significantly increased

TABLE 3

| Example<br>Comparative example | 1 | 2 | 1 | 3 | 4 | 5 | 6 | 7 | 8 | 9 |
|---|---|---|---|---|---|---|---|---|---|---|
| (1) | A | A | C | A | A | A | A | A | A | A |
| (2) | A | A | C | A | A | A | A | A | A | A |

EXAMPLES 10–13, COMPARATIVE EXAMPLES 2

A mixture of a coloring agent, a dispersing agent for the coloring agent, and water as shown in Table 4 was passed through a beads mill. The resulting dispersion was mixed with an antifreezing agent, an antiseptic agent and a water-soluble resin as shown in Table 4 to obtain a coloring agent-containing aqueous phase. Oils, an emulsifier and optionally a resin as shown in Table 5 were mixed to obtain an oil phase. The aqueous phase was gradually added to the oil phase using an emulsifying device to obtain a w/o type emulsion ink.

EXAMPLE 14

A coloring agent, oil(s) and a dispersing agent as shown in Table 5 were mixed and kneaded with three rolls. The resulting dispersion was mixed with a vanish containing an emulsifier, a resin and oil(s) as shown below to obtain an oil phase. The aqueous phase was gradually added to the oil phase using an emulsifying device to obtain a w/o type emulsion ink.

TABLE 4

| | | | | | | | Unit: parts by weight |
|---|---|---|---|---|---|---|---|
| Example<br>Comparative example | | 10 | 11 | 12 | 13 | 14 | 2 |
| Coloring agent | Carbon black | 6.0 | 6.0 | 6.0 | 6.0 | 4.0 | 6.0 |
| Extender Pigment | Talc | | | | | 0.1 | |
| Water-soluble polymer | polyvinyl pyrrolidone (K-30) | 2.0 | 2.0 | 2.0 | 2.0 | 1.5 | 2.0 |

TABLE 4-continued

| | | | | | | | Unit: parts by weight |
|---|---|---|---|---|---|---|---|
| Example<br>Comparative example | | 10 | 11 | 12 | 13 | 14 | 2 |
| Dispersing agent for coloring agent | Sulfonic acid surfactant | 0.5 | 0.5 | 0.5 | 0.5 | 0.3 | 0.5 |
| Water | Ion-exchanged water | 57.4 | 57.4 | 51.4 | 51.4 | 56.9 | 57.4 |
| Anti-freezing agent | Ethylene glycol | 10.0 | 10.0 | 10.0 | 10.0 | 10.0 | 10.0 |
| Antiseptic agent | Methyl p-oxybenzoate | 0.1 | 0.1 | 0.1 | 0.1 | 0.1 | 0.1 |

\* Coloring agent: Carbon Black #40 (products of Mitsubishi Chemical Corporation)
\* Sulfonic acid surfactant: IONET D-2 (Product of Sanyo Chemical Industries, Ltd.)

TABLE 5

| | | | | | | | Unit: parts by weight |
|---|---|---|---|---|---|---|---|
| Example<br>Comparative example | | 10 | 11 | 12 | 13 | 14 | 2 |
| Coloring agent | Carbon black | | | | | | 2.0 |
| | Phthalocyanin Blue | | | | | | 0.1 |
| Dispersing agent for coloring agent | Aluminum chelate | | | | | | 0.5 |
| Extender | Titanium oxide | | | | | | 0.1 |
| Resin | Haliphenol 173<br>Mw: 60,000 | | | | 3.0 | 1.0 | |
| Mineral oil | Gargoyle Arctic oil light | | | | 3.0 | 9.5 | 10.0 |
| | Gargoyle Arctic oil 1046 | | 10.0 | | | | |
| Vegetable oil | Soybean oil methyl ester | | 10.0 | 10.0 | 12.07 | 10.0 | |
| | Soybean oil isobutyl ester | 20.0 | | 6.0 | | | |
| | Tall oil butyl ester | | | 10.0 | 8.0 | | |
| | Soybean oil | | | | | | 10.0 |
| Emulsifier | Sorbitan monooleate | 4.0 | 4.0 | 4.0 | 4.0 | 4.0 | 4.0 |

\* Coloring agent: Carbon Black MA-7 (products of Mitsubishi Chemical Corporation)
\* Aluminum chelate: Plenact AL-M (product of Ajinomoto Inc.)

Each of above w/o type emulsion inks was tested for service stability, fixation and uniformity of a solid pattern according to the following methods. The results are summarized in Table 6.

Service Stability:

Evaluation is made in the same manner as in examples 1 to 9.

Fixation:

A sample image is printed in a paper using a commercially available printing machine, (Satelio A400 manufactured by Ricoh Company, Ltd.). The image is rubbed with fingers and the fixation of the ink is observed with naked eyes. The evaluation is rated as follows:
A: excellent
B: good
C: not good Uniformity of Solid Pattern:

A solid pattern is printed on a paper using a commercially available printing machine, (Satelio A400 manufactured by Ricoh Company, Ltd.). The image is observed with naked eyes and a magnifier. Evaluation of uniformity of solid pattern is rated as follows:
A: no small void is observed
B: image is uniform but small voids are observed
C: image is not uniform and many small voids are observed

TABLE 6

| Example | 10 | 11 | 12 | 13 | 14 | |
|---|---|---|---|---|---|---|
| Comparative Example | | | | | | 2 |
| Service stability (1) | B | B | B | B | B | C |
| Service stability (2) | B | B | B | B | B | C |
| Fixation | B | B | B | A | A | A |
| Uniformity of solid pattern | B | B | B | B | A | B |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A water-in-oil type emulsion ink comprising 10–90% by weight of an oil phase and 90–10% by weight of an aqueous phase, said oil phase containing an esterified vegetable oil, and said aqueous phase containing a coloring agent.

2. A water-in-oil type emulsion ink as claimed in claim 1, wherein said esterified vegetable oil is obtained by recycling and esterifying an edible waste oil.

3. A water-in-oil type emulsion ink as claimed in claim 1, wherein said esterified vegetable oil contains soybean oil methyl ester.

4. A water-in-oil type emulsion ink as claimed in claim 1, wherein said esterified vegetable oil contains soybean oil butyl ester.

5. A water-in-oil type emulsion ink as claimed in claim 1, wherein said esterified vegetable oil contains tall oil butyl ester.

6. A water-in-oil type emulsion ink as claimed in claim 1, wherein said oil phase contains a resin.

7. A water-in-oil type emulsion ink as claimed in claim 1, wherein said oil phase contains a coloring agent.

8. A water-in-oil type emulsion ink comprising 10–90% by weight of an oil phase and 90–10% by weight of an aqueous phase, said oil phase containing an esterified vegetable oil obtained by recycling and esterifying an edible waste oil.

9. A water-in-oil type emulsion ink as claimed in claim 8, wherein the esterified vegetable oil contains at least one selected from the group consisting of soybean oil methyl ester, soybean oil butyl ester, and tall oil butyl ester.

10. A water-in-oil type emulsion ink as claimed in claim 8, wherein the aqueous phase contains a coloring agent.

11. A water-in-oil type emulsion ink as claimed in claim 8, wherein the oil phase contains a coloring agent.

12. A water-in-oil type emulsion ink as claimed in claim 8, wherein the oil phase contains a resin.

13. A water-in-oil type emulsion ink comprising 10–90% by weight of an oil phase and 90–10% by weight of an aqueous phase, said oil phase containing an esterified vegetable oil, and said esterified vegetable oil containing soybean oil methyl ester or soybean oil butyl ester.

14. A water-in-oil type emulsion ink as claimed in claim 13, wherein the aqueous phase contains a coloring agent.

15. A water-in-oil type emulsion ink as claimed in claim 13, wherein the oil phase contains a coloring agent.

16. A water-in-oil type emulsion ink as claimed in claim 13, wherein the oil phase contains a resin.

* * * * *

UNITED STATES PATENT AND TRADEMARK OFFICE
CERTIFICATE OF CORRECTION

PATENT NO.        : 7,008,474 B2
APPLICATION NO. : 10/765884
DATED             : March 7, 2006
INVENTOR(S)       : Konno et al.

It is certified that error appears in the above-identified patent and that said Letters Patent is hereby corrected as shown below:

On the title page, and column 1, line 1: the TITLE it should read --EMULSION-- instead of "EMULSON".

Under ASSIGNEE it should read --Miyagi-ken (JP)-- instead of "Shibata-Gun (JP)".

Signed and Sealed this

Seventh Day of November, 2006

JON W. DUDAS
*Director of the United States Patent and Trademark Office*